US006936393B2

(12) United States Patent
Kubo et al.

(10) Patent No.: US 6,936,393 B2
(45) Date of Patent: Aug. 30, 2005

(54) CATALYST FOR PREPARING POLYESTER FOR TONER

(75) Inventors: Takashi Kubo, Wakayama (JP); Katsutoshi Aoki, Wakayama (JP); Eiji Shirai, Wakayama (JP); Masayuki Maruta, Wakayama (JP)

(73) Assignee: Kao Corporation, Tokyo (JP)

( * ) Notice: Subject to any disclaimer, the term of this patent is extended or adjusted under 35 U.S.C. 154(b) by 59 days.

(21) Appl. No.: 10/309,296

(22) Filed: Dec. 4, 2002

(65) Prior Publication Data

US 2003/0109668 A1 Jun. 12, 2003

(30) Foreign Application Priority Data

Dec. 6, 2001 (JP) ....................................... 2001-373155

(51) Int. Cl.[7] .................................................. G03G 9/00

(52) U.S. Cl. ............................... 430/109.4; 430/137.1; 526/89; 526/150; 526/166; 526/221; 528/274; 502/152

(58) Field of Search .......................... 430/109.4, 137.1; 526/89, 150, 166, 221; 528/274; 502/152

(56) References Cited

U.S. PATENT DOCUMENTS

| | | | | | |
|---|---|---|---|---|---|
| 4,096,129 | A | * | 6/1978 | Cook | 528/60 |
| 4,657,838 | A | | 4/1987 | Fukumoto et al. | |
| 5,683,845 | A | * | 11/1997 | Sata et al. | 430/109.4 |
| 5,750,303 | A | * | 5/1998 | Inaba et al. | 430/108.4 |
| 6,077,638 | A | * | 6/2000 | Tanikawa et al. | 430/106.2 |
| 2001/0003636 | A1 | * | 6/2001 | Suwa et al. | 430/109.1 |

FOREIGN PATENT DOCUMENTS

| | | |
|---|---|---|
| JP | 59-86622 | 5/1984 |
| JP | 61-272758 | 12/1986 |
| JP | 3-126719 | 5/1991 |
| JP | 2001-158819 | 6/2001 |

OTHER PUBLICATIONS

Patent Abstracts of Japan, JP 63–101866, May 6, 1998.

Patent Abstracts of Japan, JP 62–287260, Dec. 14, 1987.

* cited by examiner

*Primary Examiner*—Mark A. Chapman
(74) *Attorney, Agent, or Firm*—Oblon, Spivak, McClelland, Maier & Neustadt, P.C.

(57) ABSTRACT

A catalyst for preparing a polyester for a toner, comprising an inorganic tin(II) compound; a polyester resin composition comprising a polyester and the catalyst; and a toner comprising the polyester resin composition. The catalyst for preparing a polyester is suitably used for a toner which is used for developing electrostatic latent images formed in electrophotography, electrostatic recording method, electrostatic printing method, and the like.

14 Claims, No Drawings

CATALYST FOR PREPARING POLYESTER FOR TONER

BACKGROUND OF THE INVENTION

1. Field of the Invention

The present invention relates to a catalyst for preparing a polyester for a toner which is used for developing electrostatic latent images formed in electrophotography, electrostatic recording method, electrostatic printing method, and the like, a polyester resin composition comprising the catalyst, and a toner comprising the polyester resin composition.

2. Discussion of the Related Art

Recently, improvement in the initial rise in triboelectric charges of the toner has been mainly desired from the viewpoint of speeding up the copy machines in a two-component toner, and from the viewpoint of miniaturization of the copy machines in a nonmagnetic monocomponent toner. Therefore, improvements in various charge control agents have been studied. For instance, organotin(IV) compounds have been numerously reported in Japanese Patent Laid-Open Nos. Sho 63-101856, Sho 61-272758, Sho 62-287260 and the like. However, satisfactory initial rise in the triboelectric charges cannot be obtained with these organotin compounds, and generation of background fogging is observed. Therefore, further improvements have been desired.

On the other hand, as a catalyst in the preparation of the polyester used as a resin binder for a toner, there has been used an organotin(IV) compound such as dibutyltin oxide, a titanium compound such as tetra-n-butyl titanate, a germanium compound such as germanium oxide, a manganese compound such as manganese oxide, or the like. However, the influences of these catalysts on the chargeability of the toner have not been satisfactorily studied.

An object of the present invention is to provide a catalyst for preparing a polyester for a toner which has excellent initial rise in triboelectric charges and is less likely to cause background fogging, a polyester resin composition comprising the catalyst, and a toner comprising the polyester resin composition.

These and other objects of the present invention will be apparent from the following description.

SUMMARY OF THE INVENTION

The present inventors have considered that the catalyst used during the preparation of the polyester for a toner influences on the initial rise in the triboelectric charges of the polyester, and have pursued the hypothesis. The present invention has been achieved thereby.

According to the present invention, there is provided:

(1) a catalyst for preparing a polyester for a toner, comprising an inorganic tin(II) compound;

(2) a polyester resin composition comprising a polyester and the catalyst of item (1) above;

(3) a toner comprising the polyester resin composition of item (2);

(4) a method for preparing a polyester for a toner in the presence of an inorganic tin(II) compound as a catalyst; and (5) use of a catalyst for preparing a polyester of item (1) above.

DETAILED DESCRIPTION OF THE INVENTION

The feature of the present invention resides in a completely novel finding that an inorganic tin(II) compound having a function as a catalyst for preparing a polyester is very effective for improving initial rise in the triboelectric charges required for a polyester for a toner. In the present invention, the term “inorganic tin compound” refers to a tin compound which does not have an Sn—C bond.

Although the mechanism for exhibiting such outstanding effects by the inorganic tin(II) compound is yet well unknown, it is deduced that the bias of the electron density between Sn atom and O atom, a halogen atom, or the like owned by the inorganic tin(II) compound greatly influences the mechanism, and that uniform dispersion of the inorganic tin(II) compound due to the improvement in compatibility with the polyester brings about further improvement in the initial rise in the triboelectric charges.

The inorganic tin(II) compound is preferably a compound having an Sn—O bond, and a compound having an Sn—X bond, wherein X is a halogen atom, and the compound having an Sn—O bond is more preferable.

The compound having an Sn—O bond includes tin(II) carboxylates of which carboxylic acid radical has 2 to 28 carbon atoms, such as tin(II) oxalate, tin(II) diacetate, tin(II) dioctanoate, tin(II) dilaurate, tin(II) distearate and tin(II) dioleate; a dialkoxytin(II) of which alkoxy group has 2 to 28 carbon atoms, such as dioctyloxytin(II), dilauroxytin(II), distearoxytin(II) and dioleyloxytin(II); tin(II) oxide; tin(II) sulfate; and the like. The compound having an Sn—X bond, wherein X is a halogen atom, includes tin(II) halides such as tin(II) chloride and tin(II) bromide, and the like. Among them, from the viewpoints of the initial rise in the triboelectric charges and the catalytic ability, a preference is given to a tin(II) compound of a fatty acid, represented by the formula $(R^1COO)_2Sn$, wherein $R^1$ is an alkyl group or alkenyl group having 5 to 19 carbon atoms, a dialkoxytin(II) represented by the formula $(R^2O)_2Sn$, wherein $R^2$ is an alkyl group or alkenyl group having 6 to 20 carbon atoms, and tin(II) oxide represented by SnO and the tin(II) compound of a fatty acid, represented by the formula $(R^1COO)_2Sn$, and tin(II) oxide are more preferable, and tin(II) dioctanoate, tin(II) distearate and tin(II) oxide are especially preferable.

The catalyst for preparing a polyester of the present invention may properly used together with a conventionally known organotin compound, such as dibutyltin oxide, or the like within the range so that the effects of the present invention would not be inhibited.

The polyester resin composition comprising the catalyst for preparing a polyester of the present invention and the polyester can be used as a resin binder for a toner, and the polyester is prepared in the presence of the catalyst.

In the preparation of the polyester, an alcohol component comprising a dihydric or higher polyhydric alcohol and a carboxylic acid component comprising a dicarboxylic or higher polycarboxylic acid compound are used mainly as raw material monomers. Also, a monohydric alcohol and a monocarboxylic acid compound can be contained in small amounts from the viewpoints of molecular weight adjustments and improvement in offset resistance.

The dihydric alcohol includes an alkylene(2 to 4 carbon atoms) oxide(average number of moles: 1.5 to 6) adduct of bisphenol A such as polyoxypropylene(2.2)-2,2-bis(4-hydroxyphenyl)propane and polyoxyethylene(2.2)-2,2-bis(4-hydroxyphenyl)propane, ethylene glycol, propylene glycol, neopentyl glycol, 1,4-butanediol, 1,3-butanediol, 1,6-hexanediol, and the like.

The trihydric or higher polyhydric alcohol includes, for instance, sorbitol, pentaerythritol, glycerol, trimethylolpropane, and the like.

The dicarboxylic acid compound includes aromatic dicarboxylic acids such as phthalic acid, terephthalic acid, and isophthalic acid; aliphatic dicarboxylic acids such as sebacic acid, fumaric acid, maleic acid, adipic acid, azelaic acid, dodecenylsuccinic acid and dodecylsuccinic acid; alicyclic dicarboxylic acids such as cyclohexanedicarboxylic acid; derivatives such as acid anhydrides thereof, $C_{1-3}$ alkyl esters of these acids, and the like.

The tricarboxylic or higher polycarboxylic acid compound includes, for instance, aromatic carboxylic acids such as 1,2,4-benzenetricarboxylic acid (trimellitic acid), 2,5,7-naphthalenetricarboxylic acid, pyromellitic acid, derivatives such as acid anhydrides thereof, lower $C_{1-3}$ alkyl esters of these acids, and the like.

In the present invention, among the raw material monomers mentioned above, a dihydric or higher polyhydric, secondary alcohol and/or a dicarboxylic or higher polycarboxylic aromatic carboxylic acid compound is preferable. The dihydric or higher polyhydric, secondary alcohol includes propylene oxide adduct of bisphenol A, propylene glycol, 1,3-butanediol, glycerol, and the like, among which the propylene oxide adduct of bisphenol A is preferable. Among the dicarboxylic or higher polycarboxylic aromatic carboxylic acid compounds, terephthalic acid, isophthalic acid, phthalic acid and trimellitic acid are preferable, and terephthalic acid and trimellitic acid are more preferable.

As to the content of the dihydric or higher polyhydric, secondary alcohol and the dicarboxylic or higher polycarboxylic aromatic carboxylic acid compound, there are two embodiments: In a case where either one of the secondary alcohol or the aromatic carboxylic acid compound is contained, the content in the alcohol component or the carboxylic acid component is preferably from 50 to 100% by mol, more preferably from 80 to 100% by mol, in the alcohol component or the carboxylic acid component. In a case where both the secondary alcohol and the aromatic carboxylic acid compound are contained, a total content in the entire raw material monomers is preferably from 20 to 100% by mol, more preferably from 50 to 100% by mol. It is preferable to use either one of the secondary alcohol and the aromatic carboxylic acid compound, and it is more preferable to use both the secondary alcohol and the aromatic carboxylic acid compound. In the present invention, the term "the dihydric or higher polyhydric, secondary alcohol" refers to a dihydric or higher polyhydric alcohol in which at least one hydroxyl group is bonded to a secondary carbon.

Especially when the propylene oxide adduct of bisphenol A is used together with terephthalic acid, it is preferable because the electric charges can stably exist due to the resonance effects of the benzene rings contained in both the compounds. However, the effects by combined use of both the compounds can be exhibited by mixing two kinds of resins obtained by using either of the compounds as the raw materials.

The polyester can be prepared by the polycondensation of the alcohol component with the carboxylic acid component at a temperature of from 180° to 250° C. in an inert gas atmosphere in the presence of the catalyst of the present invention, under a reduced pressure as occasion demands.

The amount of the inorganic tin(II) compound used during the preparation of the polyester is preferably from 0.001 to 5 parts by weight, more preferably from 0.05 to 2 parts by weight, based on 100 parts by weight of the raw material monomers of the polyester. Accordingly, the content of the inorganic tin(II) compound in the polyester resin composition obtained by using the inorganic tin(II) compound as a catalyst is also preferably from 0.001 to 5 parts by weight, more preferably from 0.05 to 2 parts by weight, based on 100 parts by weight of the polyester.

The polyester has a softening point of preferably from 90° to 170° C., more preferably from 95° to 150° C., more, and has a glass transition point of preferably from 50° to 130° C., more preferably from 50° to 80° C.

The content of the polyester in the polyester resin composition is preferably from 50 to 100% by weight, more preferably from 80 to 100% by weight, especially preferably 100% by weight.

The resin which can be added together with the polyester includes an addition polymerization resin such as a styrene-acrylic resin, an epoxy resin, a polycarbonate, a polyurethane and the like.

The polyester may be contained in the polyester resin composition in admixture with another resin. Among the embodiments where the polyester is used together with the other resin, it is preferable that the polyester is contained in the polyester resin composition as one of resin components in a hybrid resin in which two or more resin components are partially chemically bonded to each other. Specifically, the polyester resin composition comprises a hybrid resin in which the polyester component obtained by using the catalyst of the present invention is partially chemically bonded to each other with the addition polymerization resin. Here, the hybrid resin may be obtained from two or more resins as raw materials, the hybrid resin may be obtained by using one resin and raw material monomers of the other resin, or the hybrid resin may be obtained from a mixture of raw material monomers of two or more resins. In order to efficiently obtain a hybrid resin, those obtained from a mixture of raw material monomers of two or more resins are preferable.

The polyester resin composition has a softening point of preferably from 90° to 170° C., more preferably from 95° to 150° C., and a glass transition point of preferably from 50° to 130° C., more preferably from 50° to 80° C.

Furthermore, the present invention provides a toner comprising the polyester resin composition of the present invention as a resin binder.

Incidentally, the toner of the present invention may appropriately contain, besides the polyester resin composition, an additive such as a colorant, a charge control agent, a releasing agent, a fluidity improver, an electric conductivity modifier, an extender, a reinforcing filler such as a fibrous substance, an antioxidant, an anti-aging agent, or a cleanability improver.

As the colorant, all of the dyes and pigments which are used as colorants for a toner can be used, and the colorant includes carbon blacks, Phthalocyanine Blue, Permanent Brown FG, Brilliant Fast Scarlet, Pigment Green B, Rhodamine-B Base, Solvent Red 49, Solvent Red 146, Solvent Blue 35, quinacridone, carmine 6B, disazoyellow and the like. These colorants can be used alone or in admixture of two or more kinds. In the present invention, the toner can be used as any of black toners, monochromatic toners, and full color toners. The content of the colorant is preferably from 1 to 40 parts by weight, more preferably from 3 to 10 parts by weight, based on 100 parts by weight of the resin binder.

The charge control agent includes positively chargeable charge control agents such as Nigrosine dyes, triphenylmethane-based dyes containing a tertiary amine as a side chain, quaternary ammonium salt compounds, polyamine resins and imidazole derivatives; and negatively chargeable charge control agents such as metal-containing azo dyes, copper phthalocyanine dyes, metal complexes of alkyl derivatives of salicylic acid and boron complexes of benzilic acid. The toner of the present invention may be any of positively chargeable and negatively chargeable toners. Also, the positively chargeable charge control agent and the negatively chargeable charge control agent can be used in combination.

The releasing agent includes waxes such as natural ester waxes such as carnauba wax and rice wax; synthetic waxes such as polypropylene wax, polyethylene wax and Fischer-Tropsch wax; petroleum waxes such as montan wax, alcohol waxes. These waxes may be contained alone or in admixture of two or more kinds.

The toner of the present invention can be prepared by any of conventionally known methods such as kneading and pulverization method, and emulsification phase-inversion method. For instance, in a case of a pulverized toner prepared by kneading and pulverization method, for instance, the method comprises homogeneously mixing a resin binder, a colorant, and the like in a mixer such as a Henschel mixer or a ball-mill, thereafter melt-kneading with a closed kneader or a single-screw or twin-screw extruder, cooling, pulverizing and classifying the product. In a case of emulsification phase-inversion method, for instance, the method comprises dissolving or dispersing a resin binder, a colorant or the like in an organic solvent, adding water thereto or the like to form an emulsion, thereafter separating and classifying the product. The volume-average particle size of the toner is preferably from 3 to 15 μm. Further, a fluidity improver such as hydrophobic silica or the like may be added to the surface of the toner as an external additive.

The toner of the present invention can be used alone as a developer, in a case where the fine magnetic material powder is contained. Alternatively, in a case where the fine magnetic material powder is not contained, the toner may be used as a nonmagnetic monocomponent developer, or the toner can be mixed with a carrier and used as a two-component developer.

Furthermore, the present invention provides a process for preparing a polyester for a toner in the presence of an inorganic tin(II) compound as a catalyst. The inorganic tin(II) compound can be used as a catalyst for preparing a polyester.

EXAMPLES

[Softening Point]

Softening point refers to a temperature corresponding to ½ of the height (h) of the S-shaped curve showing the relationship between the downward movement of a plunger (flow length) and temperature, namely, a temperature at which a half of the resin flows out, when measured by using a flow tester of the "koka" type ("CFT-500D," commercially available from Shimadzu Corporation) in which a 1 g sample is extruded through a nozzle having a dice pore size of 1 mm and a length of 1 mm, while heating the sample so as to raise the temperature at a rate of 6° C./min and applying a load of 1.96 MPa thereto with the plunger.

[Glass Transition Point]

The glass transition point refers to the temperature of an intersection of the extension of the baseline of equal to or lower than the maximum peak temperature and the tangential line showing the maximum inclination between the kickoff of the peak and the top of the peak, which is determined by using a differential scanning calorimeter ("DSC Model 210," commercially available from Seiko Instruments, Inc.), by raising its temperature to 200° C., cooling the hot sample to 0° C. at a cooling rate of 10° C./min., and thereafter heating the sample so as to raise the temperature at a rate of 10° C./min.

Preparation Examples for Polyester Resin Compositions A to H and O to Q

The amount 71.3 parts by weight (54% by mol) of propylene oxide(2.2 mol) adduct of bisphenol A, 28.7 parts by weight (46% by mol) of terephthalic acid and a tin compound listed in Table 1 were reacted at 235° C. under nitrogen atmosphere until the reaction mixture reached a desired softening point, to give polyester resin compositions A to H and O to Q.

Preparation Example for Polyester Resin Composition I

Raw materials listed in Table 2 were reacted at 160° C. under nitrogen atmosphere over a period of 5 hours. Thereafter, the temperature of the reaction mixture was increased to 200° C., and the components were reacted at 200° C. for 1 hour, and further reacted at 8.3 kPa for 1 hour, to give a polyester resin composition I.

Preparation Example for Polyester Resin Composition J

BPA-PO, BPA-EO, terephthalic acid and tin(II) dioctanoate in amounts shown in Table 2 were reacted at 230° C. under nitrogen atmosphere over a period of 8 hours, and the temperature of the reaction mixture was lowered to 185° C., and fumaric acid, trimellitic anhydride and hydroquinone in amounts shown in Table 2 were added thereto, and the components were reacted for 1 hour. Next, the temperature of the reaction mixture was increased stepwise to 210° C. over a period of 5 hours, and the components were reacted under a reduced pressure of 8.3 kPa until the reaction mixture reached a desired softening point, to give a polyester resin composition J.

Preparation Example for Polyester Resin Composition K

A mixture of styrene, acrylic acid, 2-ethylhexyl acrylate and di-t-butyl peroxide in amounts shown in Table 2 was added dropwise to a mixture of BPA-PO, BPA-EO, terephthalic acid, trimellitic anhydride and tin(II) dioctanoate in amounts shown in Table 2 at 160° C. under nitrogen atmosphere over a period of 1 hour, and the reaction mixture was subjected to addition polymerization reaction for additional 2 hours. Thereafter, the temperature of the reaction mixture was increased to 230° C., and the reaction mixture was subjected to condensation reaction until the reaction mixture reached a desired softening point, to give a polyester resin composition K.

Preparation Example for Polyester Resin Composition L

Raw materials shown in Table 2 were reacted at 235° C. under nitrogen atmosphere for 7 hours and the components were reacted at 8.3 kPa until the reaction mixture reached a desired softening point, to give a polyester resin composition L.

Preparation Example for Polyester Resin Composition M

Raw materials other than trimellitic anhydride shown in Table 2 were heated from 180° to 230° C. under nitrogen atmosphere over a period of 8 hours, and the components were reacted for additional 2 hours. Thereafter, trimellitic anhydride was added to the reaction mixture at 200° C., and the components were reacted until the reaction mixture reached a desired softening point, to give a polyester resin composition M.

Preparation Example for Polyester Resin Composition N

Raw materials other than trimellitic anhydride shown in Table 2 were heated from 180° to 210° C. under nitrogen atmosphere over a period of 4 hours. Thereafter, trimellitic anhydride was added to the reaction mixture, and the components were further reacted at 8.3 kPa until the reaction mixture reached a desired softening point, to give a polyester resin composition N.

The softening points and the glass transition points of the polyester resin compositions are also shown in the following Tables 1 and 2.

TABLE 1

| | Resin A | Resin B | Resin C | Resin D | Resin E | Resin F | Resin G | Resin H |
|---|---|---|---|---|---|---|---|---|
| Tin (II) Dioctanoate | 0.5 | 0.01 | 1.0 | | 0.5 | | | |
| Tin (II) Distearate | | | | 0.5 | | | | |
| Tin (IV) Oxide | | | | | 0.5 | | | |
| Dibutyltin (IV) Oxide | | | | | | 0.25 | | |
| Tin (II) Diacetate | | | | | | | 0.5 | |
| Distearoxytin (II) | | | | | | | | 0.5 |
| Softening Point (° C.) | 100.7 | 99.3 | 100.2 | 99.8 | 101.5 | 101.8 | 101.2 | 101.5 |
| Glass Transition Point (° C.) | 62.8 | 62.9 | 64.0 | 61.3 | 64.1 | 64.2 | 63.5 | 63.8 |

| | Resin O | Resin P | Resin Q |
|---|---|---|---|
| Tin (II) Oxide | 0.5 | 0.01 | 1.0 |
| Softening Point (° C.) | 99.7 | 98.6 | 100.2 |
| Glass Transition Point (° C.) | 61.4 | 60.9 | 62.5 |

Note)
Amount used is a weight proportion (parts by weight) based on 100 parts by weight of a total amount of raw material monomers.

TABLE 2

| | Resin I | Resin J | Resin K | Resin L | Resin M | Resin N |
|---|---|---|---|---|---|---|
| BPA-PO[1)] | | 39.9 (29.2) | 67.4 (52.3) | 49.6 (38.7) | | 37.0 (25.0) |
| BPA-EO[2)] | | 37.0 (29.2) | 6.9 (5.8) | 19.8 (16.6) | | 34.4 (25.0) |
| Ethylene Glycol | | | | | 9.1 (17.6) | |
| Neopentyl Glycol | | | | | 28.4 (38.7) | |
| 1,4-Butanediol | 38.0 (45.0) | | | | | |
| 1,6-Hexanediol | 5.5 (5.0) | | | | | |
| Terephthalic Acid | | 11.1 (17.2) | 24.8 (40.7) | 18.3 (30.1) | 45.9 (33.3) | |
| Fumaric Acid | 96.2 (42.5) | 9.6 (21.3) | | | | 18.4 (37.5) |
| Trimellitic Anhydride | | 2.3 (3.1) | 0.9 (1.2) | 6.0 (8.6) | 16.6 (10.4) | 10.1 (12.5) |
| Adipic Acid | 10.3 (7.5) | | | | | |
| Dodecenylsuccinic Acid Anhydride | | | | 6.3 (6.1) | | |
| Styrene | | | 21.1 | | | |
| Acrylic Acid | | | 4.0 | | | |
| 2-Ethylhexyl Acrylate | | | 1.0 | | | |
| Di-t-butyl Peroxide | | | 1.0 | | | |
| Hydroquinone | 2.8 | 2.8 | | | | |
| Tin (II) Dioctanoate | 0.5 | 0.5 | 0.6 | 0.6 | 0.5 | |
| Softening Point (° C.) | 111.9 | 99.1 | 105.0 | 147.4 | 143.3 | 145.1 |
| Glass Transition Point (° C.) | 114.5 | 57.5 | 56.1 | 64.2 | 66.1 | 58.5 |

Note)
Amount used is expressed by "parts by weight," and a numerical figure inside the parenthesis shows molar ratio.
[1)]Propylene oxide adduct (2.2 mol) of bisphenol A
[2)]Ethylene oxide adduct (2.2 mol) of bisphenol A

Examples 1 to 20 and Comparative Examples 1 and 2

A resin binder, a wax, a colorant, a charge control agent and a tin compound shown in Table 3 were introduced into a Henschel mixer, and stir-blended at a mixer temperature of 40° C. for 3 minutes, to give a mixture. The resulting mixture was melt-kneaded with a unidirectional rotary twin-screw extruder with a heating temperature inside the roller of 100° C. The resulting kneaded product was cooled, roughly pulverized, pulverized with a jet mill and classified, to give a powder having a volume-average particle size of 7.5 μm.

One-hundred parts by weight of the resulting powder were stir-blended with 0.7 parts by weight of a hydrophobic silica "TS-530" (commercially available from Cabot Corporation, average particle size: 8 nm) in a Henschel mixer for 3 minutes, to give a toner.

Comparative Example 3

The same procedures as in Example 1 were carried out using the raw materials listed in Table 3, to give a powder having a volume-average particle size of 7.5 μm. One-hundred parts by weight of the resulting powder were stir-blended with 2 parts by weight of tin(II) distearate and 0.7 parts by weight of a hydrophobic silica "TS-530" (commercially available from Cabot Corporation, average particle size: 8 nm) in a Henschel mixer for 3 minutes, to give a toner.

Here, all of the toners of Examples and Comparative Examples are negatively chargeable toners, except that the toner obtained in Example 11 is a positively chargeable toner.

Test Example 1 [Evaluation for Initial Rise in Triboelectric Charges]

The amount 0.6 g of a toner and 19.4 g of a silicone-coated ferrite carrier (commercially available from Kanto Denka Kogyo Co., Ltd, average particle size: 90 μm) were mixed together with a ball-mill at 250 r/min, and the triboelectric charges at a mixing time of 15 seconds, 30 seconds, 60 seconds, 120 seconds and 300 seconds were determined by q/m meter commercially available from Epping GmbH. The initial rise in the triboelectric charges was evaluated by using a ratio of the triboelectric charges at a mixing time of 15 seconds to the maximum triboelectric charges of the overall triboelectric charges. The results are shown in Table 3.

Test Example 2 [Evaluation of Background Fogging of Solid Image]

A toner was loaded to a nonmagnetic monocomponent developing device "PAGEPRESTO N-4" commercially available from CASIO COMPUTER CO., LTD. equipped with a stainless developer roller (roller diameter: 2.3 cm), and procedures up to transfer step were carried out, and thereafter fixing was carried out with an external fixing device under conditions such that offset would not be generated. A negatively chargeable toner obtained in each of Examples and Comparative Examples except for Example 11 was loaded to this device, and print tests mentioned below were carried out. As to the positively chargeable toner obtained in Example 11, print tests were carried out with an apparatus modified for positive chargeability using a facsimile "TF-58HW" commercially available from TOSHIBA CORPORATION which was modified in the same manner as the print tests for the negatively chargeable toner.

First, solid images of a square having each side of 2 cm were formed on a

A4 plain paper at a position 2 cm from the top center. Next, (1) in the portions where background fogging was observed by printing the solid images, the background fogging being observed at a position additionally 2 cm below the circumferential distance of the developing roller, i.e. 7.2 cm, from the top center, the image density was determined for each of 4 points which were taken 0.5 cm inside in both sides at each corner of a square having each side of 2 cm, by using L*a*b* method using a color-difference meter "CR-321" (commercially available from MINOLTA CO., LTD.), and an average was calculated. Thereafter, (2) a total of 4 points were taken from non-image bearing portions at positions of 10.2 cm away from the top center and 4 cm away and 8 away in both right and left directions, respectively. The image density was determined in the same manner as in (1), and an average was calculated.

The difference in the two values (1) and (2) (ΔE) is calculated by the following equation, and the extent of background fogging was evaluated in accordance with the following evaluation criteria. The results are shown in Table 3.

$$\Delta E=\sqrt{((L_1^*-L_2^*)^2+(a_1^*-a_2^*)^2+(b_1^*-b_2^*)^2)}$$

wherein $L_1$, $a_1$, and $b_1$, each shows determination values obtained in item (1), and $L_2$, $a_2$ and $b_2$ each shows determination values obtained in item (2).

[Evaluation Criteria]

◎: ΔE being less than 0.5;

○: ΔE being 0.5 or more and less than 1;

X: ΔE being 1 or more and less than 3; and

XX: ΔE being 3 or more.

TABLE 3

| | Resin Binder | Wax 2 parts by weight | Colorant 4 parts by weight | Charge Control Agent 1 part by weight | Initial Rise of Triboelectric Charges | Background Fogging |
|---|---|---|---|---|---|---|
| Ex. No. | | | | | | |
| 1 | Resin A/100 | NP-055 | MOGUL-L | BONTRON S-34 | 0.72 | ◎ |
| 2 | Resin B/100 | NP-055 | MOGUL-L | BONTRON S-34 | 0.51 | ○ |
| 3 | Resin C/100 | NP-055 | MOGUL-L | BONTRON S-34 | 0.61 | ◎ |
| 4 | Resin D/100 | NP-055 | MOGUL-L | BONTRON S-34 | 0.69 | ◎ |
| 5 | Resin E/100 | NP-055 | MOGUL-L | BONTRON S-34 | 0.59 | ◎ |
| 6 | Resin I/100 | NP-055 | MOGUL-L | BONTRON S-34 | 0.50 | ○ |
| 7 | Resin J/100 | NP-055 | MOGUL-L | BONTRON S-34 | 0.58 | ◎ |
| 8 | Resin K/100 | NP-055 | MOGUL-L | BONTRON S-34 | 0.57 | ○ |
| 9 | Resin L/100 | NP-055 | MOGUL-L | BONTRON S-34 | 0.58 | ◎ |
| 10 | Resin M/100 | NP-055 | MOGUL-L | BONTRON S-34 | 0.45 | ○ |
| 11 | Resin A/100 | NP-055 | REGAL 330R | BONTRON N-04 | 0.55 | ◎ |
| 12 | Resin A/100 | NP-055 | ECB-301 | LR-147 | 0.54 | ○ |
| 13 | Resin A/50<br>Resin L/50 | NP-055 | MOGUL-L | BONTRON S-34 | 0.56 | ◎ |
| 14 | Resin F/50<br>Resin L/50 | NP-055 | MOGUL-L | BONTRON S-34 | 0.45 | ○ |
| 15 | Resin A/50<br>Resin N/50 | NP-055 | MOGUL-L | BONTRON S-34 | 0.48 | ○ |
| 16 | Resin G/100 | NP-055 | MOGUL-L | BONTRON S-34 | 0.43 | ○ |
| 17 | Resin H/100 | NP-055 | MOGUL-L | BONTRON S-34 | 0.40 | ○ |
| 18 | Resin O/100 | NP-055 | MOGUL-L | BONTRON S-34 | 0.68 | ◎ |

TABLE 3-continued

| | Resin Binder | Wax 2 parts by weight | Colorant 4 parts by weight | Charge Control Agent 1 part by weight | Initial Rise of Triboelectric Charges | Background Fogging |
|---|---|---|---|---|---|---|
| 19 | Resin P/100 | NP-055 | MOGUL-L | BONTRON S-34 | 0.48 | ○ |
| 20 | Resin Q/100 | NP-055 | MOGUL-L | BONTRON S-34 | 0.59 | ⊚ |
| Comp. Ex. No. | | | | | | |
| 1 | Resin F/100 | NP-055 | MOGUL-L | BONTRON S-34 | 0.33 | X |
| 2 | Resin N/100 | NP-055 | MOGUL-L | BONTRON S-34 | 0.29 | XX |
| 3 | Resin F/100 | NP-055 | MOGUL-L | BONTRON S-34 | 0.32 | X |

It is clear from the above results that all of the toners of Comparative Examples had poor initial rise in triboelectric charges, and the background fogging is likely to be generated, as compared with those of the toners of Examples. It can be seen from the above that the effects of the initial rise in the triboelectric charges cannot be obtained when an organic tin compound such as dibutyltin compound or the like is used, and that the effects cannot be also obtained by mere external addition of an inorganic tin(II) compound to a toner surface.

According to the present invention, there can be provided a catalyst for preparing a polyester used in toners having excellent initial rise in triboelectric charges and little generation of background fogging, a polyester resin composition comprising the catalyst, and a toner comprising the polyester resin composition.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A polyester resin composition comprising a polyester prepared by polycondensation of an alcohol component with a carboxylic acid component in the presence of a catalyst, wherein the catalyst comprises an inorganic tin(II) compound other than tin(II) oxide.

2. The polyester resin composition according to claim 1, wherein the polyester is obtained from raw material monomers at least comprising a dihydric or higher polyhydric secondary alcohol and/or a dicarboxylic or higher polycarboxylic aromatic carboxylic compound.

3. The polyester resin composition according to claim 2, wherein the dihydric or higher polyhydric secondary alcohol is at least one compound selected from the group consisting of propylene oxide adducts of bisphenol A, propylene glycol, 1,3-butanediol and glycerol.

4. The polyester resin composition according to claim 2, wherein the dicarboxylic or higher polycarboxylic aromatic carboxylic compound is at least one compound selected from the group consisting of terephthalic acid, isophthalic acid, phthalic acid and trimellitic acid.

5. The polyester resin composition according to claim 1, wherein the content of the catalyst comprising the inorganic tin(II) compound is from 0.001 to 5 parts by weight, based on 100 parts by weight of the polyester.

6. The polyester resin composition according to claim 1, wherein the polyester resin composition has a softening point of 90° to 170° C.

7. A toner comprising the polyester resin composition of claim 1.

8. The toner according to claim 7, which is a pulverized toner.

9. The polyester resin composition according to claim 1, wherein the inorganic tin(II) compound is a tin compound having an Sn—O bond.

10. The polyester resin composition according to claim 1, wherein the inorganic tin(II) compound is selected from the group consisting of a tin(II) carboxylate of which carboxylic acid radical has 2 to 28 carbon atoms, and a dialkoxytin(II) of which alkoxy group has 2 to 28 carbon atoms.

11. The polyester resin composition according to claim 1, wherein the inorganic tin(II) compound is selected from the group consisting of a tin(II) compound of a fatty acid represented by the formula $(R^1COO)_2Sn$, wherein $R^1$ is an alkyl group or alkenyl group having 5 to 19 carbon atoms, and a dialkoxytin(II) represented by the formula $(R^2O)_2Sn$, wherein $R^2$ is an alkyl group or alkenyl group having 6 to 20 carbon atoms.

12. The polyester resin composition according to claim 1, wherein the inorganic tin(II) compound is selected from the group consisting of tin(II) dioctanoate and tin(II) distearate.

13. A polyester resin composition comprising a polyester prepared in the presence of a catalyst, wherein the catalyst comprises an inorganic tin(II) compound, wherein the polyester is one of resin components contained in a hybrid resin in which two or more resin components are partially chemically bonded to each other.

14. A process comprising preparing a polyester for a toner by polycondensation of an alcohol component with a carboxylic acid component in the presence of an inorganic tin(II) compound other than tin(II) oxide as a catalyst.

* * * * *